No. 856,724. PATENTED JUNE 11, 1907.
H. RICHARDSON.
WEIGHING AND ASSORTING APPARATUS.
APPLICATION FILED JAN. 16, 1906.
2 SHEETS—SHEET 1.
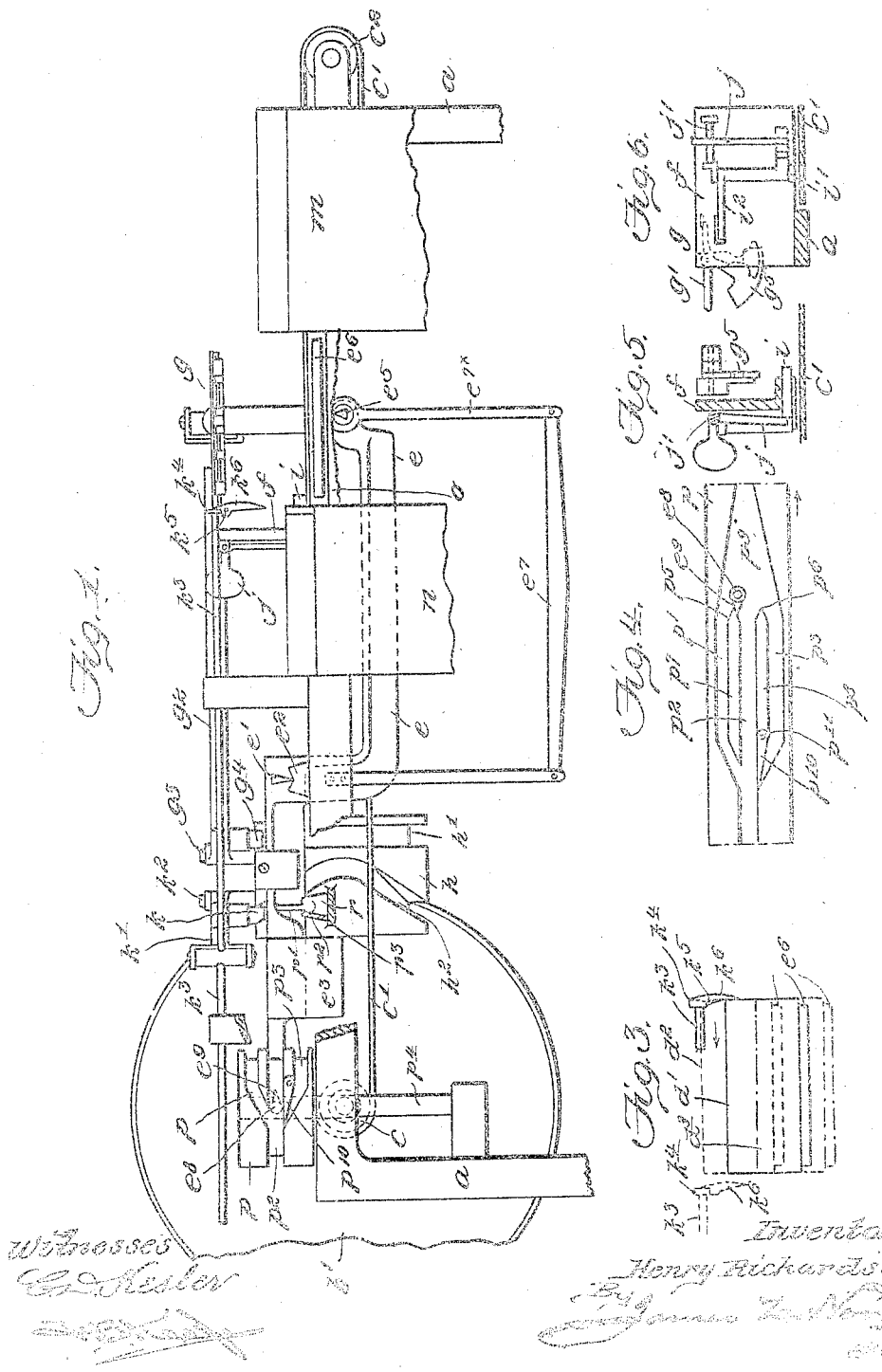

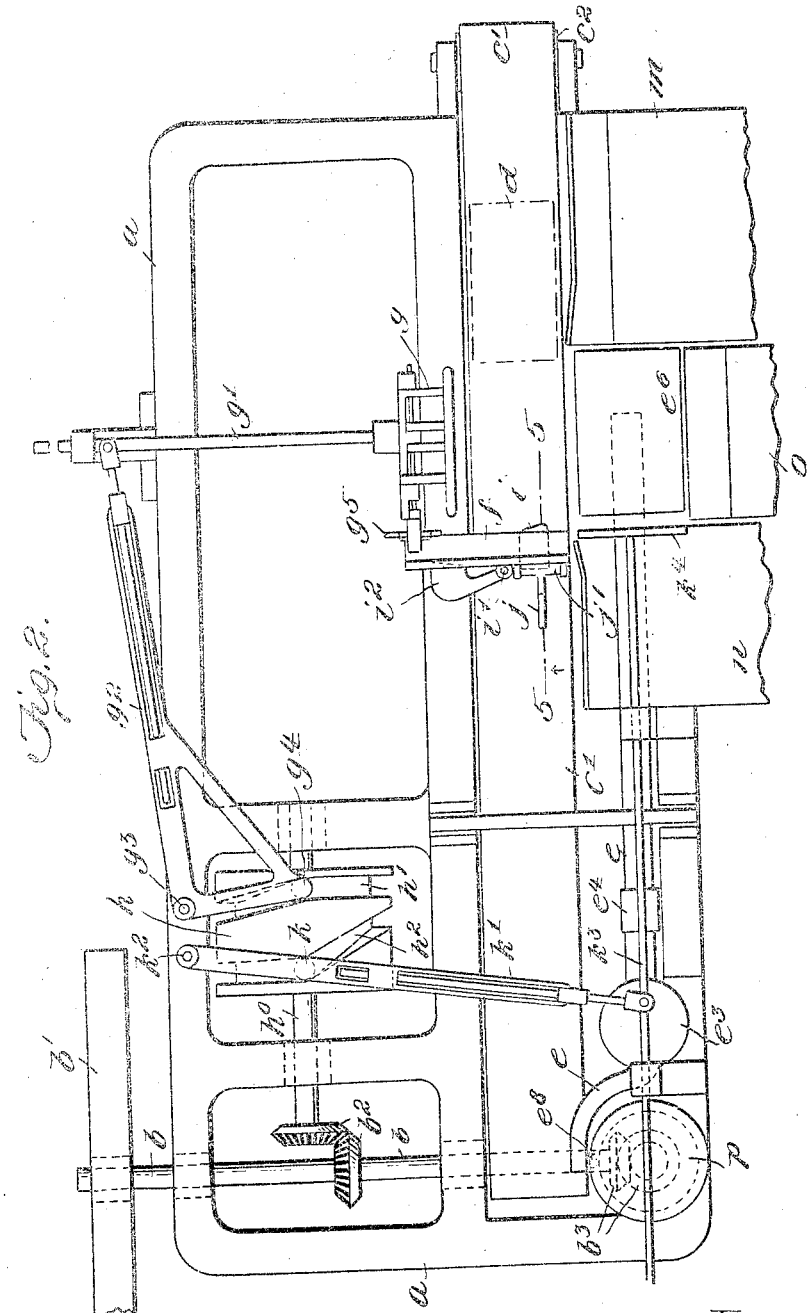

UNITED STATES PATENT OFFICE.

HENRY RICHARDSON, OF NEW YORK, N. Y.

WEIGHING AND ASSORTING APPARATUS.

No. 856,724.

Specification of Letters Patent.

Patented June 11, 1907.

Application filed January 16, 1906. Serial No. 296,331.

*To all whom it may concern:*

Be it known that I, HENRY RICHARDSON, a subject of the King of Great Britain, residing at New York, county of New York, and State of New York, have invented certain new and useful Improvements in Weighing and Assorting Apparatus, of which the following is a specification.

This invention relates to an improved apparatus for automatically testing the correct weight of parcels of goods and other articles and for sorting those in which the weight is incorrect, and has for its object a machine which automatically tests the weight of parcels which are supposed to contain a given weight of goods, and which after having weighed the parcels makes a distinction between those of the right weight with an additional distinction between those parcels which are heavier and those which are lighter than the given weight, that is, the parcels which are brought to the weighing machine in order to be tested are divided by the machine into three different classes, namely, first, those weighing the right weight, second, those that are too heavy and third, those that are too light.

In order that this invention may be clearly understood and more easily carried into practice, I have appended hereunto sheets of drawings upon which I have illustrated a simple form of embodiment of an apparatus including my invention.

In these drawings, Figure 1 is a part front elevation of the apparatus. Fig. 2 is a plan of the apparatus. Fig. 3 is a diagram showing the action of the unloading mechanism. Fig. 4 is a view of the cam. Fig. 5 is a section on the line 5—5, Fig. 2. Fig. 6 is a side view of Fig. 5.

In carrying this invention into effect $a$ is the frame of the machine in which revolves a main shaft $b$ carrying supports carrying the driving pulley $b'$. On the shaft $b$ a drum $c$ is fixed which drives an endless belt or band $c'$ passing over a second drum $c^2$ mounted in the frame and upon this band $c'$ are put the parcels $d$ which are to be tested.

$e$ is a beam supported by means of angular pivots or knife edges $e^1$ on bearings $e^2$ of the frame. This beam is provided at one end with a counterweight $e^3$ and a regulating weight, with a running apparatus $e^4$; at the other end the beam is provided with one of the angular pivots or knife edges $e^5$. The load-carrier $e^6$ of the weighing machine is kept in the proper position by the lever $e^{7}$ fulcrumed on a bearing of the frame $a$ and connected with the link $e^7$ hung from the knife edges $e^5$.

The parcel $d$ which is to be weighed is conducted by a suitable carrier as the movable belt $c'$ to the load-carrier $e^6$ and it is stopped in its forward motion on that belt, by a stop $f$ which keeps it in the proper position, in front of the load-carrier (shown as a pan) of the weighing machine until it is pushed sidewise off the belt $c'$ on the said load-carrier, by a pushing apparatus $g$ which is pivotally supported at the inner extremity of an arm $g'$ to which motion is given, in a horizontal direction, by a grooved lever $g^2$ mounted at $g^3$. This latter lever $g^2$ is itself set in motion by a cam $h$ which is mounted on a shaft $h^0$ receiving its motion from shaft $b$ by means of bevel wheels $b^2$. A groove $h'$ is formed in the cam in which works an anti-friction roller $g^4$ mounted upon the lever $g^2$. The shape of groove $h'$ is such that the pushing apparatus $g$ pushes the parcel $d$ onto scale pan $e^6$ at the moment when this scale pan is ready to receive it, and is such also, that after having pushed the said parcel on the scale pan, it is brought back to rest in the position as shown by Fig. 2. In that position, the pushing apparatus $g$ is normally kept lifted up horizontally at the end of arm $g'$ Fig. 6, by a counterweight $g^5$, but as soon as a parcel carried by the belt $c'$ is ready to come in contact with stop $f$, it comes across first of all the end of a movable projection $i$, see Figs. 1, 2, 5 and 6, which moves horizontally at $i'$ and is pushed back a little before the stop $f$, through which it passes actuating a lever $j$ with counterweight pivotally supported at $j'$. The parcel coming in contact with the projection $i$ moves it back in a direction contrary to the action of the counterweight $j$, causing the pawl $i^2$ which is rigidly connected with the projection $i$ to move out in front of stop $f$, and in the path of the counterweight $g^5$. At the time of the movement forward of the arm $g'$ under the action of cam $h'$ to cause the pushing apparatus to push the parcel onto the scale pan $e^6$, the counterweight $g^5$ moves and meets the pawl $i^2$ whereby the latter will elevate said counterweight $g^5$ and cause the pushing apparatus $g$ to swing down into a vertical position so that when said pushing apparatus is in said vertical position it can move a parcel, package or the like from the belt $c'$ onto the said scale pan $e^6$. Should there not be a parcel against the stop $f$ it will be apparent that when the rod or arm $g^1$ is advanced said pushing apparatus $g$ will not be swung down. In the cam $h$ is another groove $h^2$ in which works an anti-friction roller $k$ mounted on a grooved lever $k'$ which is mounted at $k^2$ and gives a reciprocating movement to a rod $k^3$ provided with a second pushing apparatus $k^4$ the function of which is either to push or to draw the parcel off the scale according to the indication shown by the weighing of the said parcel, in order to bring it in front of the place, or passage for unloading, out of which it will be removed according to whether the parcel weighs the exact weight or on the contrary, is either too heavy or too light.

The pushing apparatus $k^4$ is formed with a head which is rigidly fastened crosswise to the end of the rod $k^3$ and to which is pivoted at $k^5$ a pawl $k^6$ adjusted in such a way that if it happens to meet an obstacle during the time of the movement of the rod $k^3$ it turns in one direction but it is mounted in such a way that it does not turn in the reverse direction.

The relative actions of the pushing apparatus $g$ and $k^4$ are as follows:—When once the parcel has been stopped on the moving belt $c'$ by the stop $f$, it is pushed off that belt onto the scale pan $e^6$ by the pushing apparatus $g$ which has been pulled down as before described. As soon as the parcel is on the scale pan $e^6$, the weighing takes place and the beam $e$ takes a position corresponding to the weight of that particular parcel. If the parcel is too light, the head of the pushing apparatus $k^4$ as the rod $k^3$ is advanced pushes the parcel which is then in position $d'$ Fig. 3, from off the scale pan $e^6$ in order to bring it onto a suitable receiving device as the chute $m$ for unloading which chute $m$ is sloping and is arranged on the frame, at a level corresponding to that of the parcel. The latter slides to the bottom of said chute at which point it can be received in any way. If on the contrary, the parcel weighs the right weight, the position taken thereby is as shown by $d^2$ in Fig. 3. At the time of the movement of the pushing apparatus $k^4$, the pawl $k^6$ and not the head $k^4$ of the pushing apparatus comes into contact with the parcel when in position $d^2$ and that pawl turns and slides on the top of the parcel without moving it. But, on the return motion of rod $k^3$ and pushing apparatus the pawl $k^6$ draws the parcel when in position $d^2$ therewith as shown by arrow, Fig. 3, and brings it in front of a second sloping chute $n$, which is fixed at the corresponding level on the frame $a$, and leading to a point different from the one where the chute $m$ ends. If, however, the parcel is too heavy the counterweights $e^3$ $e^4$ are not sufficient to lift up the scale $a^6$ and the parcel which is on that scale occupies a position as shown in $d^3$, Fig. 3. The pushing apparatus $k^4$ and the pawl $k^6$ pass the heavy parcel without striking the same in moving backward and forward above the heavy parcel and allow the latter to remain on the scale pan $e^6$. Now it is at that very time that the pushing apparatus $g$ advances, and if, between times, a second parcel has been brought against the stop $f$ to be pushed by the pushing apparatus $g$ on the scale pan $e^6$, this second parcel will push off the first one, onto the third sloping chute $o$ such chute being at a corresponding level and leading to a third point for unloading.

In order to make sure that the beam $e$ will be kept in the position required during the unloading of the parcel, such beam, is provided at one end thereof with an anti-friction roller $e^8$ which works in the grooves $p'$ $p^2$ $p^3$ of a cam $p$ mounted on a vertical shaft $p^4$, receiving its motion from the main shaft $b$, by means of the bevel wheels $b^3$. A spur or working main knife $e^9$ is arranged on the beam in front of the friction roller $e^8$ which knife works against the edges $p^5$, $p^6$, of the projections $p^7$, $p^8$ which divide the grooves $p'$ $p^2$ $p^3$ of the cam, in order to remove every cause of stoppage caused by the friction roller engaging with the edges of one of the projections and thus guide the friction roller into the particular groove where it has to work in order to keep beam $e$ in the required position, which is determined by the weighing of the parcel which is on scale pan $e^6$ at the moment. Fig. 4 shows the open space $p^9$ where the three grooves $p'$, $p^2$, $p^3$ of cam $p$ open into each other. The mounting of the cam upon shaft $p^4$ and the subsequent rotation of the cam are regulated in such a way that space $p^9$ finds itself in front of the friction roller $e^8$ and of spur $e^9$ which can then change their place vertically without engaging any obstacles in order to allow the friction roller $e$ to swing freely at the time when the weighing of the parcel placed on scale pan $e^6$ takes place. In order to prevent the friction roller $e^8$ falling abruptly from the projection $p^8$ at the time when it comes out of the groove $p^2$ which might damage the knives, the end of the projection $p^8$ is provided with a tongue $p^{10}$ pivoted at $p^{11}$ along which the friction roller $e^8$ when passing in groove $p^2$ crosses without falling into the end of the groove $p^3$, while the tongue $p^{10}$ rises again after passage of the friction roller $e^8$ into groove $p^3$ in order not to interfere with the working of same.

In order to allow a certain amount of latitude for the extra or deficient weight between a parcel weighing exactly the required weight and another parcel short of weight, the beam $e$ bears, near counterweight $e^3$ a small additional weight is hung at the end and is fastened on by means of a flange $r^2$ and on which it can slide freely. If the parcel placed on the scale pan $e^6$ is too light, the opposite end of the beam $e$ goes down and the flange $r^2$ goes down also with rod $r'$ inside the weight $r$ which it allows to rest on a small table or rest $r^3$ fastened to the frame $a$. If the parcel weighs the required weight the beam $e$ does not rise at the opposite end of scale pan $e^5$ owing to the slight resistance which the weight $r$ opposes to it neither does it go down, it being so arranged that, when the beam is exactly in equilibrium, the flange $r^2$ moves and rests against weight $r$. Finally if the parcel be very heavy, it causes the scale pan $e^6$ to go down, and the opposite end of the beam rises and the weight by means of the flange $r^2$ above the rest $r$ which is calculated in such a way that it corresponds to the allowance in weight.

The operation of the machine is as follows: The parcel which has been placed on the belt $c'$ advances with the latter and engages with the stop $f$ being then pushed onto the scale pan $e^6$ by the pushing apparatus $g$ which is advanced for such purpose by the cam $h$. The weighing takes place then, during which the pushing apparatus $g$ is returned to its initial position by said cam; the beam $e$ is brought to a stand still by the passage of the cam grooves $p$ on the friction roller $e^8$ of the beam according to the position taken by the beam during the weighing and after which the rod $k^3$ and pushing apparatus $k^4$, $k^6$ come forward, then backward under the action of cam $h$. If the parcel is too light it is pushed by the pushing apparatus $k^4$ into the chute $m$; if it weighs the correct amount it is drawn by pawl $k^8$, into the chute $n$ and, finally, if it is too heavy it is left by the pushing apparatus on scale $e^6$ from where it is pushed by the next parcel into the chute $o$.

I do not confine myself to the exact construction or details hereinbefore described as the same may be modified to suit various requirements such for instance as in the case of the weighing and sorting of coins for use in connection with coin actuated machines.

What I claim is:

1. In an apparatus of the class described, the combination of a load receiver and a beam, the beam having an additional weight adapted to be elevated when a parcel beyond the correct weight is placed onto the load receiver, a power operated carrier for advancing parcels toward the weighing mechanism, a stop for arresting the motion of a parcel opposite the load receiver, and mechanism for moving the parcel from off the carrier and onto the load receiver.

2. In an apparatus of the class described, the combination of a load carrier, beam mechanism associated therewith, a parcel carrier for conducting parcels to the load carrier, a pushing apparatus to push a parcel off the parcel carrier on the load carrier, and a second pushing apparatus provided with means for pushing parcels off the load carrier in opposite directions, and in a direction different from that followed by the first mentioned parcel.

3. In an apparatus of the class described, the combination of a load carrier, beam mechanism associated therewith, a parcel carrier for conducting parcels to the load carrier, a pushing apparatus to push a parcel off the parcel carrier on the load carrier, a second pushing apparatus provided with means for pushing parcels off the load carrier in opposite directions, and in a direction different from that followed by the first mentioned parcel, and means for locking the beam mechanism temporarily against motion at the conclusion of a weighing operation.

4. In an apparatus of the class described, a load carrier, beam mechanism associated with the load carrier, and a pushing apparatus mounted for movement across the load carrier and having a part when the pushing apparatus moves in one direction to push a package off said load carrier and having a second part to push a package off the load carrier occupying a different level than the first mentioned package on the opposite movement of said pushing apparatus.

5. In an apparatus of the class described, a load carrier, beam mechanism associated with the load carrier, and a pushing apparatus mounted for movement across the load carrier and having a part when the pushing apparatus moves in one direction to push a package off said load carrier and having a second part to push a package off the load carrier occupying a different level than the first mentioned package on the opposite movement of said pushing apparatus, and a second pushing apparatus to move a package onto the load carrier.

6. The combination of weighing mechanism including a load receiver, a carrier for parcels, means for moving parcels from the carrier onto said load receiver, and a reciprocatory pushing device having a head to push a parcel from the load carrier when said device moves in one direction and having a movable member for pushing a parcel from the load receiver when said pushing device is moved in the opposite direction, and means for preventing movement of said movable member on the last mentioned motion.

7. The combination of a load receiver and its supporting beam, the beam having an antifriction roll at the outer side of its center of motion, a rotary member having a plurality of parallel projections dividing said member into channels, the projections being made in the form of knife edges at the entering ends of the channels, a knife edge carried by the beam in adjacence to the antifriction roll to guide the latter into a channel as said member rotates, the latter serving when the antifriction roll is in one of its channels to lock the beam against movement, and a tongue pivotally connected with one of the projections at the end opposite that having the knife edge, to prevent dropping of the antifriction roll.

8. The combination of weighing mechanism including a load receiver, a carrier for parcels, means for stopping a parcel on the carrier, a power operated pushing apparatus for pushing the parcel from the carrier onto the load receiver, and a power operated pushing apparatus for pushing a parcel off the load receiver.

9. The combination of weighing mechanism including a load receiver, a parcel carrier for effecting the supply of parcels to said load receiver, a stop for arresting the motion of a parcel on said parcel carrier, a pushing apparatus for pushing a parcel from the carrier onto the said load receiver, a second pushing apparatus for pushing a parcel off the load receiver; and means involving cam mechanism for actuating the two pushing apparatus.

10. The combination of weighing mechanism including a load receiver, a parcel carrier, a device for pushing a parcel from said parcel carrier onto the load receiver and for also, acting through a parcel, to push a parcel off the load receiver, and a second device provided with means acting along different levels for pushing parcels off the load receiver.

In testimony whereof I have hereunto set my hand in presence of two subscribing witnesses.

HENRY RICHARDSON.

Witnesses:
E. F. SMITH,
M. M. RONNIE.